(12) United States Patent
Dai et al.

(10) Patent No.: US 11,874,216 B2
(45) Date of Patent: Jan. 16, 2024

(54) AUTOMATIC REACTIVE OXYGEN SPECIES CONTENT DETECTION SYSTEM SUITABLE FOR CELL MICROENVIRONMENT

(71) Applicant: ZHEJIANG UNIVERSITY, Zhejiang (CN)

(72) Inventors: Yongdong Dai, Zhejiang (CN); Lulu Liu, Zhejiang (CN); Songying Zhang, Zhejiang (CN); Xiaomei Tong, Zhejiang (CN); Xiaona Lin, Zhejiang (CN); Xiang Lin, Zhejiang (CN); Yonghang Shen, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 469 days.

(21) Appl. No.: 17/292,540

(22) PCT Filed: Sep. 25, 2020

(86) PCT No.: PCT/CN2020/117629
§ 371 (c)(1),
(2) Date: May 10, 2021

(87) PCT Pub. No.: WO2021/208366
PCT Pub. Date: Oct. 21, 2021

(65) Prior Publication Data
US 2022/0236167 A1 Jul. 28, 2022

(30) Foreign Application Priority Data

Apr. 14, 2020 (CN) .......................... 202010289512.X

(51) Int. Cl.
*G01N 21/11* (2006.01)
*G01N 21/64* (2006.01)
*G01N 21/03* (2006.01)

(52) U.S. Cl.
CPC .......... *G01N 21/11* (2013.01); *G01N 21/6428* (2013.01); *G01N 2021/0325* (2013.01);
(Continued)

(58) Field of Classification Search
CPC .......... G01N 2500/00; G01N 2333/902; G01N 2333/918; G01N 2333/92; G01N 2800/52;
(Continued)

(56) References Cited

U.S. PATENT DOCUMENTS

2010/0317093 A1* 12/2010 Turewicz ................ B01L 3/505
204/600

FOREIGN PATENT DOCUMENTS

CN 103424383 A * 12/2013
CN 103424383 A 12/2013
(Continued)

OTHER PUBLICATIONS

International Search Report from PCT/CN2020/117629 dated Jan. 18, 2021, 5 pgs.

*Primary Examiner* — Michael P Stafira
(74) *Attorney, Agent, or Firm* — Tutunjian & Bitetto, P.C.

(57) ABSTRACT

The present disclosure relates to a biochemical detection instrument. The technical solution is an automatic reactive oxygen species content detection system suitable for a cell microenvironment that includes: a sample transmission reaction system and a detection system which are communicated in sequence through a light avoiding pipeline. A washing system is in communication with the sample transmission reaction system through a water pipeline, and a purge system is in communication with the sample transmission reaction system through a gas pipeline. The sample transmission reaction system further includes a sample injector and a DCFH supply bin which are communicated (Continued)

with a reaction bin through light avoiding pipelines after being connected in parallel. Sample injection valves are respectively configured between the sample injection valve and the reaction bin and between the DCFH supply bin and the reaction bin.

10 Claims, 1 Drawing Sheet

(52) U.S. Cl.
CPC ............... *G01N 2021/0346* (2013.01); *G01N 2021/115* (2013.01); *G01N 2021/6417* (2013.01); *G01N 2021/6439* (2013.01); *G01N 2021/6482* (2013.01)

(58) Field of Classification Search
CPC ........... G01N 33/6893; G01N 33/5044; G01N 33/57426; G01N 2333/70589; G01N 2800/22; G01N 33/5011; G01N 33/5041; G01N 33/5055; G01N 33/5073; G01N 33/5008; G01N 33/57434; G01N 2333/4706; G01N 2333/90; G01N 2333/978; G01N 2800/7004; G01N 33/502; G01N 33/57407; G01N 33/6875; G01N 33/84; G01N 21/6428; G01N 33/50; G01N 33/58; G01N 2021/0325; G01N 2021/0346; G01N 2021/115; G01N 2021/6417; G01N 2021/6439; G01N 2021/6482; G01N 2021/7786; G01N 21/11; G01N 21/645; G01N 2333/723; G01N 2500/10; G01N 2800/105; G01N 33/5058; G01N 33/57496; G01N 2021/7769; G01N 2021/7776; G01N 2021/7789; G01N 21/63; G01N 21/636; G01N 21/658; G01N 21/77; G01N 23/02; G01N 2333/70582; G01N 2800/342; G01N 33/5088; G01N 33/5091; G01N 33/52; G01N 33/574; G01N 33/57492; G01N 33/6872; G01N 1/30; G01N 15/14; G01N 2035/00237; G01N 2035/1034; G01N 21/03; G01N 21/6456; G01N 2333/4712; G01N 2333/90245; G01N 2333/91045; G01N 2333/916; G01N 2333/96411; G01N 2800/44; G01N 2800/56; G01N 33/15; G01N 33/5029; G01N 33/5038; G01N 33/5094; G01N 33/53; G01N 33/57484; G01N 33/6857; G01N 33/946; G01N 35/00; G01N 35/00584; G01N 35/10; G01N 35/1004
See application file for complete search history.

(56) References Cited

FOREIGN PATENT DOCUMENTS

| CN | 206431040 U | * | 8/2017 | |
|---|---|---|---|---|
| CN | 109459401 A | | 3/2019 | |
| CN | 110346341 A | | 10/2019 | |
| CN | 110441203 A | | 11/2019 | |
| CN | 110554010 A | | 12/2019 | |
| CN | 111426663 A | | 7/2020 | |
| GB | 2265709 A | | 10/1993 | |
| WO | WO-2011035959 A1 | * | 3/2011 | ........ B01L 3/502715 |
| WO | 2016191342 A1 | | 12/2016 | |

* cited by examiner

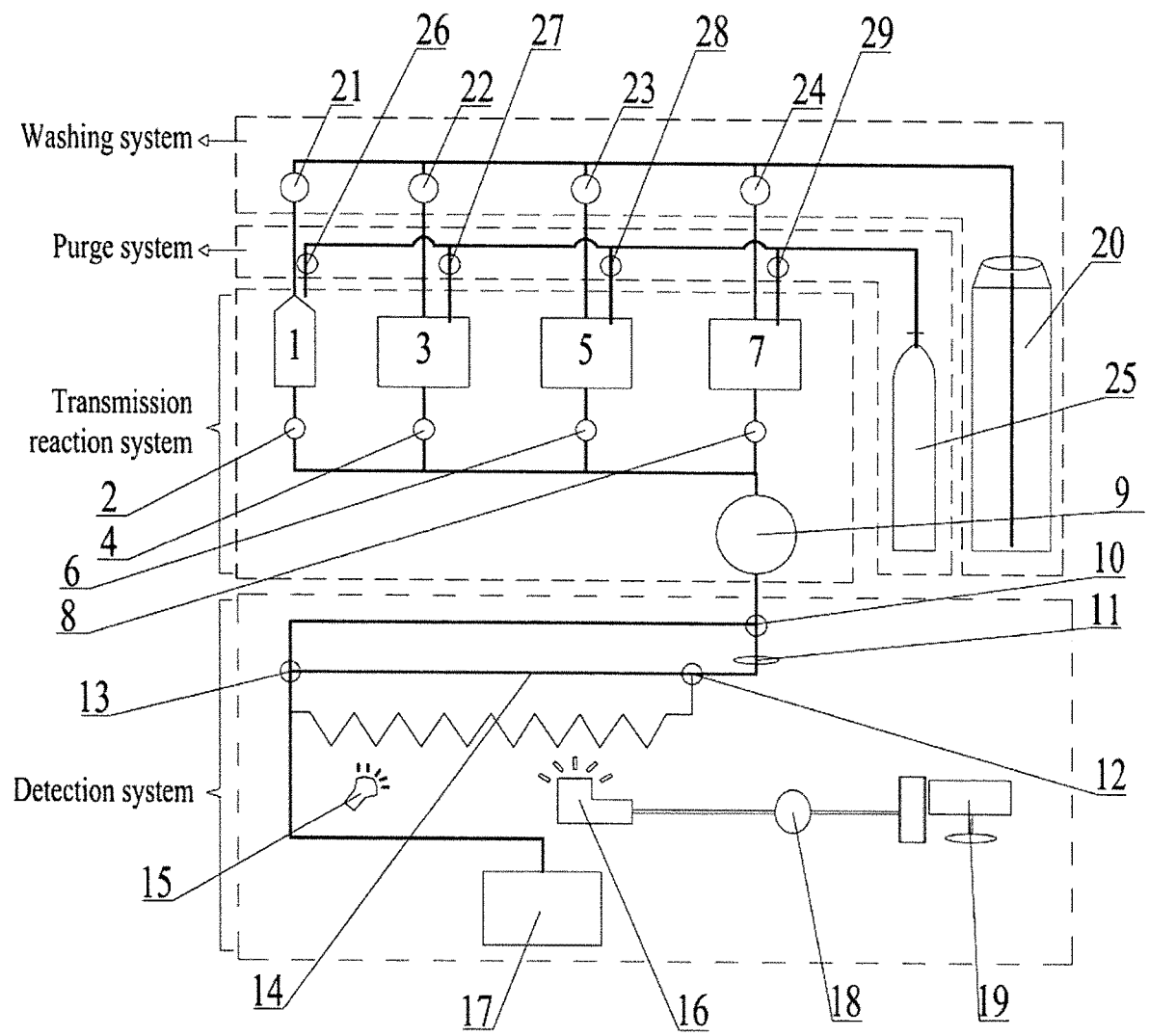

AUTOMATIC REACTIVE OXYGEN SPECIES CONTENT DETECTION SYSTEM SUITABLE FOR CELL MICROENVIRONMENT

TECHNICAL FIELD

The present disclosure relates to a biochemical detection instrument, and in particular, to an instrument for automatically detecting the content of reactive oxygen species in a trace liquid of a microenvironment of cells, tissues, and organs.

BACKGROUND

Reactive oxygen species (ROS) refers to peroxides, oxygen-containing free radicals, and the like which are converted from the oxygen entering mitochondria through metabolism in aerobic organisms and have strong reducibility and strong oxidizability. Common ROS are hydrogen peroxide ($H_2O_2$), hypochlorite/hypochlorite ion ($HClO/ClO^-$), peroxynitrite ion ($ONOO^-$), hydroxyl free radical (OH), nitric oxide (NO), superoxide anion ($O_2 \cdot ^-$), and lipid peroxide free radical (ROO). ROS is constantly produced in the body, and it is also constantly cleared by some antioxidants in the body, so as to maintain a dynamic balance level and affect a variety of physiological and pathological processes. Maintaining the ROS in the body at a low-balance and harmless level is very important for a normal physiological process: participating in the regulation of proliferation and differentiation processes in cell growth, participating in signal transduction and energy synthesis of cells, and participating in the synthesis process of some important substances, such as nucleotides and proteins, in the body. Over-high level of ROS causes an Oxidative Stress (OS) reaction in cells, so as to damage the gene structures and normal functions of the cells, seriously damage the cells, and further induce cell canceration, death, and a series of diseases, such as atherosclerosis, rheumatoid arthritis, cardiovascular and cerebrovascular diseases, cataract, neurological diseases, and tumor. Over-high ROS can damage biological macromolecules, such as DNA, biological membranes, and protein, in the body.

The microenvironments of cells, tissues, and organs, including pleural fluid, peritoneal fluid, cerebrospinal fluid, amniotic fluid, follicular fluid, and cell culture medium, have a certain concentration of ROS. It is reported that the oxidation of an oxidative phosphorylation system on cell membranes is the main source of extracellular ROS. However, some studies believe that these ROS molecules come from intracellular diffusion, so the ROS level in the microenvironment of the cells can reflect intercellular ROS level. The detection of the content of the ROS in the microenvironment of the cells is helpful for us to understand the content of the ROS in the cells, and the detection of the ROS level of body fluid, such as pleural fluid, peritoneal fluid, cerebrospinal fluid, amniotic fluid, and follicular fluid, of patients provides a new indicator for us to understand diseases, and provides a basis for the prevention and treatment of diseases. The detection of the ROS level in cell culture fluid is helpful for us to understand dynamic changes of the ROS level of the cells, and provides a new idea for the understanding of regulation and control of cellular biological activities and molecular signaling pathways.

At present, there are a chemiluminescence method, a colorimetric method, a fluorescence method, and an electrochemical fluorescence method for detecting cellular ROS level. The method for detecting the cellular ROS level by a DCFH-DA fluorescent probe method has been widely developed as a mature kit for the detection of cellular ROS due to the advantages of fast chemical reaction, low price, high product fluorescence intensity, high sensitivity, simple and convenient detection, and the like. DCFH-DA does not have fluorescence, can pass through cell membranes freely, and can be hydrolyzed to produce DCFH by esterase in the cells after entering the cells. However, the DCFH cannot pass through the cell membranes, so that the probe is easily loaded into the cells. The ROS in the cells can oxidize the DCFH without fluorescence to produce DCF with fluorescence, and the reaction between the DCFH and ROS molecules does not have specificity, so the overall level of the ROS in cells can be determined by detecting the fluorescence of the DCF. Because the body fluid in the cell microenvironment does not contain esterase, when the DCFH-DA is used for detecting the ROS in extracellular fluid, it is necessary to obtain a DCFH liquid from the CFH-DA by an alkaline method or a deasterase method in advance. Because the DCFH is sensitive to air and light, it is prone to auto-oxidation, which affects the accuracy of detection, so a DCFH reaction solution needs to be prepared freshly, and the reaction system and the detection system need to be calibrated by using $H_2O_2$ with known concentration under the action of horseradish peroxidase (HRP).

In the detection of the ROS based on the chemiluminescence method, the colorimetric method, the fluorescence method, and the electrochemical fluorescence method, the commonly used instruments include a flow cytometry, a multi-functional microplate reader, a fluorescence microscope, and the like. Because the ROS in a sample is unstable when exposed to the air, and the existing detection methods all need to go through multiple steps, such as probe loading, incubating, washing, and machine running, so it is difficult to achieve the purpose of rapidly, accurately, and automatically detecting the ROS in a large amount of samples by the instruments above, and there is no available ROS level detection method in clinical examination. Therefore, the design and manufacture of a rapid automatic detection system for the content of reactive oxygen species in a cell microenvironment is of great practical significance to understand the physiological and pathological processes of organisms including human beings.

SUMMARY

The objective of the present disclosure is to provide a rapid, accurate, and automatic detection system for realizing the content of ROS in a large number of samples and a micro volume with respect to the microenvironment of cells, tissues, and organs, such as pleural fluid, peritoneal fluid, cerebrospinal fluid, amniotic fluid, follicular fluid, and cell culture fluid to overcome the disadvantages in BACKGROUND.

To achieve the above objective, the present disclosure adopts the technical solutions:

An automatic reactive oxygen species content detection system suitable for a cell microenvironment includes a sample transmission reaction system and a detection system which are communicated in sequence through a light avoiding pipeline, a washing system which is communicated with the sample transmission reaction system through a water pipeline, and a purge system which is communicated with the sample transmission reaction system through a gas pipeline.

The sample transmission reaction system includes a sample injector and a DCFH supply bin which are communicated with a reaction bin through a light avoiding pipeline after being connected in parallel. Sample injection valves are respectively configured between the sample injector and the reaction bin and between the DCFH supply bin and the reaction bin.

The washing system includes a water supply bin and water pipelines which make the water supply bin communicate with each of the sample injector and the DCFH supply bin and are provided with washing pumps.

The purge system includes a gas source and gas pipelines which make the gas source communicate with each of the sample injector and the DCFH supply bin and are provided with gas pressure valves.

The detection system includes a light transmitting microfluidic pipe and a waste liquid collector that are communicated with the reaction bin through a light avoiding pipeline system. In addition, a fluorescence detector provided with a light source is also adopted for detecting a sample in the light transmitting microfluidic pipe. The signal obtained by the fluorescence detector is transmitted to a data processing terminal after being converted through a photoelectric converter.

The sample transmission reaction system further includes an HRP supply bin and an $H_2O_2$ standard liquid supply bin which are connected to the reaction bin after being connected in parallel through light avoiding pipelines. Sample injection valves are respectively configured between the HRP supply bin and the reaction bin and between the $H_2O_2$ standard liquid supply bin and the reaction bin. The washing system further includes water pipelines which make the water supply bin communicate with each of the HRP supply bin and the $H_2O_2$ standard liquid supply bin and are provided with washing pumps. The purge system further includes gas pipelines which make the gas source communicate with the HRP supply bin and the $H_2O_2$ standard liquid supply bin and are provided with gas pressure valves.

The light avoiding pipeline system includes a first three-way valve, a filter, a second three-way valve, and a third three-way valve that are communicated in sequence through the light avoiding pipelines to realize the flushing of different parts, such as the reaction bin, the filter (11), and the light transmitting microfluidic pipe (to realize the flow rate control of a liquid flow). One end of the light transmitting microfluidic pipe is connected to the second three-way valve, and the other end of the light transmitting microfluidic pipe is connected to a pipeline between the third three-way valve and the waste liquid collector. The first three-way valve is also bypassed with the third three-way valve through another light avoiding pipeline. The purpose is to flush different parts. When different parts are flushed, the flow rate can be changed. For example, when the reaction bin is flushed, the filter side of the first three-way valve is closed, and the third three-way valve side of the first three-way valve is opened, at this time, the flushing pressure can be adjusted to the maximum due to small pipeline resistance. The flushing with respect to the filter is that the filter can be flushed after the machine has been used for a period of time because the filter may be blocked to a certain extent, but it does not need to be replaced, at this time, the hydraulic pressure is moderate. The light transmitting microfluidic pipe needs to be flushed and purged before each sample is detected. When the light transmitting microfluidic pipe is flushed, the hydraulic pressure should be adjusted to the minimum to avoid the damage to the light transmitting microfluidic pipe.

The gas source is a $CO_2$ steel cylinder or an $N_2$ steel cylinder.

The light source is a light emitting diode, a xenon lamp, or a laser.

The fluorescence detector is a photomultiplier tube or a solid state photomultiplier tube.

A filter that can filter the light with the wavelength of 485 to 500 nm is configured at the light source, and the wavelength of effective excitation light is 485 to 500 nm. A filter that can filter the light with the wavelength of 515 to 530 nm is configured in front of the fluorescence detector, so as to filter away the excitation light of 485 to 500 nm. The wavelength of the light to be detected received by the fluorescence detector is 515 to 530 nm.

The light avoiding pipeline adopt quartz capillaries wrapped with polytetrafluoroethylene, polydimethylsiloxane, polymethyl methacrylate, or a light avoiding material.

The light transmitting microfluidic pipe adopts a liquid core optical fiber, a quartz capillary, or a glass capillary.

The quantitative volume of the sample injection valve is 20 to 2,000 ul.

The reaction temperature of the reaction bin is 4 to 40°.

The present disclosure has the beneficial effects that: each sub-system included in the present disclosure has compact layout and light equipment. The present disclosure is simple in structure and convenient to maintain, can operate automatically for a long time, and can be calibrated periodically and automatically, and has high detection speed and high sensitivity in combination with a liquid flow micro-control technology. The detection system provided by the present disclosure is obviously better than the existing detection means in terms of application scenarios (the existing instrument equipment and reagents can only meet the requirements of scientific research laboratories, but basically cannot meet the requirements of clinical application). The detection system of the present disclosure has the characteristics of high sensitivity, high accuracy, high detection speed, convenience in operation, and the like, can realize rapid, accurate, and automatic detection of the content of the ROS in a large number of samples and a micro volume with respect to the fluids of microenvironments of cells, tissues, and organs of pleural fluid, peritoneal fluid, cerebrospinal fluid, amniotic fluid, follicular fluid, cell culture medium, and the like, so, the detection system has good application prospect in scientific research experiments and clinical examinations.

BRIEF DESCRIPTION OF THE DRAWINGS

FIG. 1 is a schematic diagram of a system connection relationship of the present disclosure.

DETAILED DESCRIPTION

The following further describes the shown embodiments with reference to the accompanying drawing.

In the automatic reactive oxygen species content detection system suitable for a cell microenvironment as shown in the accompanying drawing: a sample transmission reaction system is communicated with a detection system through a light avoiding pipeline, a washing system is communicated with the sample transmission reaction system (transmission reaction system for short) through a water pipeline, and a purge system is communicated with the sample transmission reaction system through a gas pipeline.

In the sample transmission reaction system, output ends of a sample injector 1, a DCFH supply bin 3, an HRP supply bin 5, and an $H_2O_2$ standard liquid supply bin 7 are communicated with a reaction bin 9 after being connected in parallel, and then are communicated with the detection system. Sample injection valves are respectively configured between each of the sample injector, the DCFH supply bin, the HRP supply bin, and the $H_2O_2$ standard liquid supply bin and the detection system (as shown in the accompanying drawing: a first sample injection valve 2 is configured between the sample injector and the detection system; a second sample injection valve 4 is configured between the DCFH supply bin and the detection system; a third sample injection valve 6 is configured between the HRP supply bin and the detection system; a fourth sample injection valve 8 is configured between the $H_2O_2$ standard liquid supply bin and the detection system). When the sample transmission reaction system is used, target samples can be input by opening related sample injection valves as required.

In the washing system, the water supply bin 20 is connected to each of the water pipelines of washing pumps in series to be communicated with the sample injector, the DCFH supply bin, the HRP supply bin, and the $H_2O_2$ standard liquid supply bin (as shown in the accompanying drawing: the water supply bin is communicated with the sample injector through a water pipeline which is connected in series with a first washing pump 21, is communicated with the DCFH supply bin through a water pipeline which is connected in series with a second washing pump 22, is communicated with the HRP supply bin through a water pipeline which is connected in series with a third washing pump 23, and is communicated with the $H_2O_2$ standard liquid supply bin through a water pipeline which is connected in series with a fourth washing pump 24).

In the purge system, the gas source 25 (preferably, a $CO_2$ steel cylinder or an $N_2$ steel cylinder) is communicated with the sample injector, the DCFH supply bin, the HRP supply bin, and the $H_2O_2$ standard liquid supply bin through gas pipelines that are connected to gas pressure valves in series (as shown in the accompanying drawing: the gas source is communicated with the sample injector through a gas pipeline which is connected in series with a first gas pressure valve 26, is communicated with the DCFH supply bin through a gas pipeline which is connected in sequence with a second gas pressure valve 27, is communicated with the HRP supply bin through a gas pipeline which is connected in sequence with a third gas pressure valve 28, and is communicated with the $H_2O_2$ standard liquid supply bin through a gas pipeline which is connected in series with a fourth gas pressure valve 29).

The detection system includes a first three-way valve 10, a filter 11, a second three-way valve 12, a third three-way valve 13, and a waste liquid collector 17 that are communicated in sequence through the light avoiding pipelines (the light avoiding pipelines are preferably made of high polymer materials, such as polytetrafluoroethylene). One end of a light transmitting microfluidic pipe 14 is connected to the second three-way valve 12 (namely, the pipeline between the filter 11 and the third three-way valve), and the other end of the light transmitting microfluidic pipe 14 is connected to the pipeline between the third three-way valve and the waste liquid collector. The first three-way valve 10 is also bypassed with the third three-way valve 13 through a light avoiding pipeline. In addition, a fluorescence detector 16 (preferably, a photomultiplier tube or a solid state photomultiplier tube) provided with a light source 15 (preferably, a light emitting diode, a xenon lamp, or a laser) is also adopted for detecting a sample in the light transmitting microfluidic pipe. The light signal detected by the fluorescence detector is converted into an electric signal through a photoelectric converter 18, and the electric signal is transmitted to a data processing terminal 19 (computer) for processing.

1. The physical and chemical principles of the present device are that: the DCFH is obtained after the deasterification of DCFH-DA (2',7'-dichlorofluorescein diacetate), both the DCFH-DA and the DCFH do not have fluorescence, and the reactant DCFH can be oxidized into a DCF substance with strong fluorescence under the action of the reactive oxygen species. The DCFH is a mature detection dye for the reactive oxygen species, and the excitation wavelength of the DCF obtained after the oxidization is 485 to 500 nm, and the emission wavelength is 515 to 530 nm.

2. The light source 15 adopted by the present system for detecting the DCF fluorescence intensity to detect the content of the reactive oxygen species may be a light emitting diode, a xenon lamp, or a laser. A filter that can filter the light with the wavelength of 485 to 500 nm is configured at the light source, and the wavelength of effective excitation light is 482 to 500 nm.

3. The fluorescence detector 16 adopted by the present system for detecting the DCF fluorescence intensity to detect the content of the reactive oxygen species may be a photomultiplier tube or a solid state photomultiplier tube. The filter that can filter the light with the wavelength of 515 to 530 nm is configured before a light signal is received. The wavelength of the light to be detected received by the fluorescence detector is 515 to 530 nm, and the excitation light can be effectively filtered away.

4. The light transmitting microfluidic pipe of the DCF fluorescence intensity detection system of the present system for detecting the content of the reactive oxygen species may adopt a liquid core optical fiber, a quartz capillary, or a glass capillary. The liquid core fiber can effectively collect an emitted light signal and enhance the sensitivity of light intensity detection, which overcomes the problem that it is difficult to detect accurately by ordinary methods because the extracellular ROS level is lower than the intracellular ROS level. When incident light enters the liquid core optical fiber, the excitation light can be totally reflected in the optical fiber and transmitted forward along the optical fiber all the time because the refractive index of the optical fiber is lower than that of the sample, which is helpful to increase the optical path of the excitation light passing through the sample, so as to improve the light signal intensity and the final detection sensitivity. When a capillary or glass capillary is used as the light transmitting microfluidic pipe, the area of light emitting signals can be increased in a manner of winding or reciprocating the light transmitting microfluidic pipe, so as to enhance the sensitivity of light intensity detection.

5. The present system for detecting the content of the reactive oxygen species in a cell microenvironment can be self-detected and calibrated by the standard liquid $H_2O_2$ provided by a third party, which can effectively eliminate the data drift caused by the difference of different batches of reactants and different instrument states. In addition, the present system can set a specific time interval (for example, 4 hours) for automatically calibrating. Molecular equivalent of the reactive oxygen species is calculated for the ROS content of the sample based on a baseline value. The introduction of a relative $H_2O_2$ROS equivalent is beneficial to maintaining the accuracy of data and is helpful for the comparability of the data in multi-center detection.
6. The reactants DCFH liquid and the HRP (horseradish peroxidase) liquid of the present system are freshly prepared, and the DCFH liquid may be obtained by an alkaline deasterification method through NaOH, and may also be obtained by catalyzation through a deasterase. The DCFH is sensitive to air and light and is prone to auto-oxidation to affect the accuracy of detection, so both fresh preparation and storage in dark place are the keys. Meanwhile, the automatic calibration of the system at a specific time interval (for example, 4 hours) and the introduction of the relative $H_2O_2$ROS equivalent are also the keys for ensuring the system accuracy.
7. After the fluorescence intensity detection of the present system, a photoelectric conversion is configured, which effectively converts a light intensity signal into an electric signal, and the electric signal is converted into a digital signal in matched control software and data processing terminal. After the data processing software calculates and stores a relative reactive oxygen species concentration after comparing the digital signal with previous calibration parameters. The relative reactive oxygen species concentration is characterized by taking the activity of the third-party standard liquid $H_2O_2$ as a relative equivalent to ensure the stability of the detection and the accuracy of the data.
8. The present system can realize automatic detection of the content of the reactive oxygen species of a trace liquid because the sample transmission reaction system, the detection system, and the washing system of the device all take a microfluidic technology as a basis and electromechanical integration and central system control are combined.
9. All pipelines related to the samples and the reactants described in the system are light avoiding pipelines and can be made of high polymer materials, including polytetrafluoroethylene, which can slow down the DCFH photosensitive chemical reaction to the greatest extent, thereby reducing a nonspecific signal.
10. The first sample injection valve 2, the second sample injection valve 4, the third sample injection valve 6, and the fourth sample injection valve 8 in the present system can realize accurate control of the trace liquid, and the quantitative volume can be set as 20 to 2000 ul.
11. The present system is configured with the reaction bin 9 that can automatically mix liquids, so as to ensure full and uniform mixing of the samples. The reaction temperature is 4 to 40°. The reaction time can be adjusted according to the concentration of the reactive oxygen species of the samples. On the premise of constant temperature and timing, the repeatability of reaction and the accuracy of the data can be ensured.
12. A replaceable filter 11 is arranged between the light transmitting microfluidic pipe and the reaction bin of the present system, which effectively filters trace solid substances in a reaction liquid, so as to prevent the light transmitting microfluidic pipe from being blocked.
13. A three-way valve 12 is arranged behind the filter of the present system, so that the pipelines and bins of the sample transmission reaction system can be washed rapidly in a non-detection cycle of an instrument. In addition, a three-way valve 10 is arranged between the reaction bin and the filter, so that the filter of the equipment is not used during a flushing process, thereby prolonging the service life of the filter.
14. The present system is configured with the washing system which takes ultra-pure water as a washing liquid, and all of the first washing pump 21, the second washing pump 22, the third washing pump 23, and the fourth washing pump 24 can realize the functions of boosting and flushing. A deep washing function can be realized when the ultra-pure water is replaced with a detergent.
15. The present system is configured with the parts for purging by using the gases, such as $CO_2$ or $N_2$, so as to effectively remove trace oxygen remaining in the pipelines and bins, thereby preventing an oxidation reaction from being affected, and improving the accuracy of the detection.
16. The detection reaction of the present system is based on the oxidation of the DCFH without fluorescence to form a fluorescent substance DCF, and the content of the ROS in the sample is reflected by using the DCF fluorescence intensity. Although the reaction principle is the same as that of the mainstream ROS detection kits in the market, the existing kits rely on the equipment, such as a flow cytometry, a fluorescence microscope, and a multi-functional microplate reader, for detecting, which cannot achieve the purpose of full-automatic and integrated detection of the trace liquid. The process parameters related to the present system include: DCFH concentration and volume, HRP concentration and volume, standard liquid $H_2O_2$ concentration and volume, pH value of a buffer solution, and the storage conditions and the validity period of the DCFH, the HRP and the $H_2O_2$, the reaction temperature, the reaction time, the pressure intensity of the washing liquid and the washing time, and the purging gas pressure and the purging time.

The system described in the present disclosure can combine and call the following modes, and complete corresponding functions. A mode debugging mode (control terminal software system default program or optional function operation) is integrated into the data processing terminal.

1. Startup

The power supply of the equipment and the power supply of a control terminal are turned on.

2. Self-Checking

The control terminal identifies the equipment, determines that various sample injection valves, three-way valves, washing pumps, and gas pressure valves are all in a closed state, determines that a circuit control system and a motor system are in a stand-by state, determines that pipelines are smooth, determines that the reaction bin is preheated to the optimal reaction temperature, determines that the liquid volumes of the DCFH supply bin, the HRP supply bin, and the $H_2O_2$ standard liquid supply are not less than the minimum volume, determines that the water storage and the gas storage of the water supply bin and the gas steel cylinder are not less than the minimum value, and determines that the waste liquid volume of the waste liquid collector is not higher than the maximum value. Self-checking is completed when the above states are confirmed, otherwise, various parts of the equipment are restored to corresponding states or prompt to change corresponding states manually (for example, adding the ultra-pure water and pouring the waste liquid).

3. Calibration

The third sample injection valve 28 is opened to inject a quantitative HRP liquid into the reaction bin 9, and the third sample injection valve is closed. The fourth sample injection valve 29 is opened to inject a quantitative $H_2O_2$ standard liquid into the reaction bin 9, and the fourth sample injection valve 27 is closed. The liquids in the reaction bin are mixed to wait for reaction. The second sample injection valve is opened to inject a quantitative DCFH liquid into the reaction bin, and the second sample injection valve is closed. The liquids in the reaction bin are mixed to wait for reaction. A filter side valve of the first three-way valve 20 is opened, a light transmitting microfluidic pipe side valve of the second three-way valve 12 is opened, the light source is turned on, the fluorescence detector detects a fluorescence signal, photoelectric conversion is performed, and data are processed and standardized. A common flushing mode and a purging mode of the sample injector are automatically operated after the calibration is completed.

4. Detection

The sample is manually added into the sample injector 1. The equipment automatically opens the first sample injection valve 2 to inject a quantitative sample to be detected into the reaction bin, and the first sample injection valve 2 is closed. The second sample injection valve 4 is opened to inject a quantitative DCFH liquid into the reaction bin 9, and the second sample injection valve is closed. The liquids in the reaction bin 9 are mixed to wait for reaction. The filter side valve of the first three-way valve 10 is opened, the light transmitting microfluidic pipe side valve of the second three-way valve 12 is opened, the light source is turned on, the fluorescence detector detects the fluorescence signal, photoelectric conversion is performed, data are processed, and the relative $H_2O_2$ROS equivalent of the sample to be detected is calculated on the basis of standardization. The common flushing mode and the purging mode of the sample injector 1 are automatically operated after the detection is completed.

5. Flushing

1) Common Flushing Mode of Sample Injector

The first sample injection valve 2, the filter side valve of the first three-way valve 10, and the light transmitting microfluidic pipe side valve of the second three-way valve 12 are opened. The first washing pump 21 is turned on to flush the sample injector 1 periodically, and the first washing pump 21, the first sample injection valve 2, the filter side valve of the first three-way valve 10, and the light transmitting microfluidic pipe side valve of the second three-way valve 12 are closed. The flushing mode mainly flushes the sample injector 1, the reaction bin 9, the filter 11, the light transmitting microfluidic pipe 14, and the series connected pipelines.

2) Flushing Mode of Sample Injector and Filter

The first sample injection valve 2, the filter side valve of the first three-way valve 10, and a non-light transmitting microfluidic pipe side valve of the second three-way valve 12, and the waste liquid collection side valve of the third three-way valve 13 are opened. The first washing pump 21 is turned on to flush the sample injector 1 periodically, and the first washing pump 21, the first sample injection valve 2, the filter side valve of the first three-way valve 10, the non-light transmitting microfluidic pipe side valve of the second three-way valve 12, and the waste liquid collection side valve of the third three-way valve 13 are closed. The flushing mode mainly flushes the sample injector 1, the reaction bin 9, the filter 11, and the series connected pipelines, but does not flush the light transmitting microfluidic pipe side valve. The mode mainly operates when the light transmitting microfluidic pipe side valve does not need to be flushed, which can accelerate the flushing speed properly, and reduce the damage to the light transmitting microfluidic pipe.

3) Rapid Flushing Mode of Pipeline of Sample Injector Pipeline

The first sample injection valve 2, the filter side valve of the first three-way valve 10, and the waste liquid side valve of the third three-way valve 13 are opened, the first washing pump 21 is turned on to flush the sample injector 1 periodically. The first washing pump 21, the first sample injection valve 2, the filter side valve of the first three-way valve 10, and the waste liquid collection side valve of the third three-way valve 13 are then closed. The flushing mode mainly flushes the sample injector 1, the reaction bin 9, and the series pipelines, and does not flush the filter 11 and the light transmitting microfluidic pipe side valve. The mode mainly operates when the filter 11 and the light transmitting microfluidic pipe 14 do not need to be flushed, which can flush the sample injector 1, the reaction bin 9, and the series connected pipelines at the rapidest speed, and reduce the damage to the filter 11 and the light transmitting microfluidic pipe 14. The flushing mode is defaulted to be the flushing mode that must be performed before the equipment is shut down.

4) Flushing Mode of DCFH Supply Bin, HRP Supply Bin, and $H_2O_2$ Standard Liquid Supply Bin The second 4, or the third 6, or the fourth 8 sample injection valves, the filter side valve of the first three-way valve 10, and the waste liquid collection side valve of the third three-way valve 13 are opened, and the second 22, or the third 23, or the fourth 24 washing pump is turned on to flush the DCFH supply bin 3, the HRP supply bin 5, and the $H_2O_2$ standard liquid supply bin 7 periodically. The second 22, or the third 23, or the fourth 24 washing pump is turned off, and the second 4, or the third 6, or the fourth 8 sample injection valve, the non-filter side valve of the first three-way valve 10, and the waste liquid collection side valve of the third three-way valve 14 are closed. The flushing mode mainly flushes the DCFH supply bin, the HRP supply bin, the $H_2O_2$ standard liquid, and related pipelines rapidly before the DCFH liquid, the HRP liquid, or the $H_2O_2$ standard liquid are replaced. The flushing mode does not flush the filter and the light transmitting microfluidic pipe.

5) Deep Cleaning Mode of Sample Injector

The ultra-pure water is replaced by the detergent in the water supply bin 20, the first sample inlet valve, the non-filter side valve of the first three-way valve 10, and the waste liquid collection side valve of the third three-way valve 13 are opened. The first washing pump 21 is turned on to introduce liquid into the sample injector 1 with a low pressure and slow flow. The first washing pump 21, the first sample injection valve 2, the non-filter side valve of the first three-way valve and the waste liquid collection side valve of the third three-way valve 13 are closed. The flushing mode performs deep flushing on the equipment for periodic maintenance, which mainly performs deep cleaning on the sample injection bin, the reaction bin, and the series connected pipelines, and does not wash the filter and the light transmitting microfluidic pipe. After deep cleaning of the sample injector is completed, the equipment automatically performs five repeated rapid flushing modes of the sample injector pipeline and one repeated common flushing mode of the sample injection bin.

6. Purging

1) Purging Mode of Sample Injector

The first sample injection valve 2, the filter side valve of the first three-way valve 10, and the light transmitting microfluidic pipe side valve of the second three-way valve 12 are opened, the first sample injection valve 2 is turned on to purge the sample injector 1 periodically, and the first gas pressure valve 21, the first sample injection valve 2, the filter side valve of the first three-way valve 10, and the light transmitting microfluidic pipe side valve of the second three-way valve 12 are closed. The purging mode mainly purges the sample injector 1, the reaction bin 9, the filter 11, the light transmitting microfluidic pipe 14, and the series connected pipelines.

2) Purging Mode of DCFH Supply Bin, HRP Supply Bin, and $H_2O_2$ Standard Liquid Supply Bin The second 4, or the third 6, or the fourth 8 sample injection valve, the non-filter side valve of the first three-way valve 10, and the waste liquid collection side valve of the third three-way valve 13 are opened. The second 27, or the third 28, or the fourth 29 gas pressure valve is opened to purge the sample injector 1 periodically, and the second 27, the third 28, or the fourth 29 gas pressure valve, the second 4, or the third 6, or the fourth 8 sample injection valve, the non-filter side valve of the first three-way valve 10, and the waste liquid collection side valve of the third three-way valve 13 are closed. The purging mode mainly purges the DCFH supply bin, the HRP supply bin, the $H_2O_2$ standard liquid, and related pipelines rapidly before the DCFH liquid, the HRP liquid, or the $H_2O_2$ standard liquid are replaced.

7. Shutdown

After the common flushing mode of the sample injector is operated for once, the equipment operates the rapid flushing mode of the pipeline of the sample injector for three times. Various sample injection valves, the three-way valves, the washing pumps, and the gas pressure valves are determined to be in closed states, the power supply of the circuit control system and the motor system are disconnected, the power supply of the equipment is turned off, and the control terminal and the power supply thereof are shut down.

What is claimed is:

1. An automatic reactive oxygen species content detection system suitable for a cell microenvironment, comprising:
  a sample transmission reaction system and a detection system which are communicated in sequence through a light avoiding pipeline, the sample transmission reaction system having a sample injector and a DCFH supply bin which are in communication with a reaction bin through light avoiding pipelines after being connected in parallel, a first sample injection valve is positioned inline of the light avoiding pipes between the sample injector and the reaction bin and a second sample injection valve is positioned inline of the light avoiding pipes between the DCFH supply bin and the reaction bin;
  a washing system which is communicated with the sample transmission reaction system through a water pipeline, the washing system having a water supply bin and water pipelines connecting the water supply bin with each of the sample injector and the DCFH supply bin, a first washing pump is positioned inline of the water pipelines between the sample injector and water supply bin and a second washing pump is positioned inline of the water pipelines between the sample injector and the DCFH supply bin; and
  a purge system which is communicated with the sample transmission reaction system through a gas pipeline the purge system having a gas source and gas pipelines connecting the gas source each of the sample injector and the DCFH supply bin, a first gas pressure valve is positioned inline of the gas pipelines between the sample injector and the gas source, and a second gas pressure valve positioned inline of the gas pipelines between the DCFH supply bin and the gas source;
  the detection system having:
    a light transmitting microfluidic pipe and a waste liquid collector in communication with reaction bin through a light avoiding pipeline system; and
    a fluorescence detector provided with a light source is configured to detect a sample in the light transmitting microfluidic pipe; the fluorescence detector generating a light signal converted to an electric signal by a photoelectric converter that is transmitted to a data processing terminal.

2. The automatic reactive oxygen species content detection system suitable for a cell microenvironment according to claim 1, wherein the sample transmission reaction system further comprises:
  an HRP supply bin and an $H_2O_2$ standard liquid supply bin which are connected to the reaction bin after being connected in parallel through light avoiding pipelines,
  a third sample injection valve positioned between the HRP supply bin and the reaction bin;
  a fourth sample injection valve positioned between the H2O2 standard liquid supply bin and the reaction bin;
  wherein the washing system further comprises water pipelines connecting the water supply bin to each of the HRP supply bin and the H2O2 standard liquid supply bin, a third washing pump positioned inline of the water pipelines between the HRP supply bin and the water supply bin, and a fourth washing pump positioned inline of the water pipelines between the H2O2 standard liquid supply bin and the H2O2 supply bin; and
  wherein the purge system further comprises gas pipelines connecting the gas source to each of the HRP supply bin and the H2O2 supply bin, and a third gas pressure valve positioned inline of the gas pipelines between the gas source and the HRP supply bin, and a fourth gas pressure valve positioned inline of the gas pipelines between the gas source and the H2O2 supply bin.

3. The automatic reactive oxygen species content detection system suitable for a cell microenvironment according to claim 2, wherein the light avoiding pipeline system comprises:
  a first three-way valve,
  a filter,
  a second three-way valve, and
  a third three-way valve, the first three-way valve, the filter, the second three-way valve and the third three-way valve are connected in sequence through the light avoiding pipelines;
  wherein one end of the light transmitting microfluidic pipe is connected to the second three-way valve, and the other end of the light transmitting microfluidic pipe is connected to a pipeline between the third three-way valve and the waste liquid collector, the first three-way valve is also bypassed with the third three-way valve through another light avoiding pipeline, so as to realize a flushing with respect to the reaction bin, the filter, and the light transmitting microfluidic pipe.

4. The automatic reactive oxygen species content detection system suitable for a cell microenvironment according to claim 3, wherein the gas source is a $CO_2$ steel cylinder or an $N_2$ steel cylinder.

5. The automatic reactive oxygen species content detection system suitable for a cell microenvironment according to claim 4, wherein the light source is a light emitting diode, a xenon lamp, or a laser.

6. The automatic reactive oxygen species content detection system suitable for a cell microenvironment according to claim 5, wherein the fluorescence detector is a photomultiplier tube or a solid state photomultiplier tube.

7. The automatic reactive oxygen species content detection system suitable for a cell microenvironment according to claim 6, wherein the fluorescence detector is configured with a filter that can filter the light with the wavelength of 515 to 530 nm, so as to receive the detection light with the wavelength of 515 to 530 nm; a filter that can filter the light with the wavelength of 485 to 500 nm is configured at the light source, and the wavelength of effective excitation light is 485 to 500 nm.

8. The automatic reactive oxygen species content detection system suitable for a cell microenvironment according to claim 7, wherein the light avoiding pipelines are quartz capillaries wrapped with polytetrafluoroethylene, polydimethylsiloxane, polymethyl methacrylate, or light avoiding materials.

9. The automatic reactive oxygen species content detection system suitable for a cell microenvironment according to claim 8, wherein the light transmitting microfluidic pipe adopts a liquid core optical fiber, a quartz capillary, or a glass capillary.

10. The automatic reactive oxygen species content detection system suitable for a cell microenvironment according to claim 9, wherein the quantitative volume of the sample injection valve is 20 to 2,000 ul.

* * * * *